Patented May 29, 1945

2,377,188

UNITED STATES PATENT OFFICE 2,377,188

STABILIZED FILTER PREPARATIONS

Erwin Schwenk, Montclair, and Edward E. Henderson, Montville, N. J., assignors to Schering Corporation, Bloomfield, N. J., a corporation of New Jersey No Drawing. Application August 7, 1941, Serial No. 405,794

10 Claims. (Cl. 167—90)

The present invention relates to stabilized compositions, such as lotions and creams, for filtering or absorbing ultra-violet light, and especially the more dangerous rays, and relates in particular to stabilized compositions containing a sun ray filtering substance which is subject to deterioration in air. The invention relates more especially to "sun-tan" preparations containing such substance in an amount sufficient to filter out the injurious sun rays to a greater or less degree while permitting the beneficial and tanning rays to pass through.

As the preferred embodiment of our invention is a preparation containing hydroquinone as the sun ray absorbing substance, we shall describe our invention in greater detail in connection with compositions containing such substance.

Hydroquinone preparations, and especially preparations made with a white cream base, have proved to be impractical for the reason that within a short time the preparation becomes brown as a result of the oxidation of the hydroquinone. Even where the degree of oxidation was not sufficient to impair seriously the effectiveness of the cream preparation, its market value was destroyed by the discoloration.

Attempts have been made to overcome this difficulty by the addition of various reducing agents to the hydroquinone composition, but so far as we are aware, without success. Where inorganic reducing salts, like sodium sulfite, were employed, there was a tendency for the cream or lotion emulsion to break, due to a salting out effect, causing separation of the components and thus destroying the homogeneity of the mixture. Similar efforts with organic reducing agents have likewise proved unavailing. Thus the known reducing sugars have proved to be incapable of inhibiting or preventing deterioration of the ray-absorbing agent. Similarly, aldehyde sugars generally, like glucose, and other ordinarily reducing organic substances like citric acid, have not proved satisfactory.

We have found that in general compounds having the ene-diol group

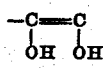

and particularly aliphatic carboxylic acids and lactones having such group, and their salts, such as the sodium, potassium, and other alkali metal salts, and likewise the alkaline earth metal salts, and in general the soluble salts, are effective to prevent or inhibit deterioration or oxidation of air-unstable sun ray filters, and in particular discoloration of hydroquinone-containing preparations.

Among the substances having the ene-diol structure above referred to is laevo-ascorbic or cevitamic acid (vitamin C). This compound is known to take part in oxidation-reduction reactions, or to catalyze the same; yet we have found that it has the remarkable property of inhibiting the oxidation of oxidizable sun ray filters like hydroquinone, and at same time has the desirable property that it does not act to break the emulsion of which a cream or lotion base may be constituted. In view of the fact that ascorbic acid is itself sensitive to oxidation and is rapidly destroyed in the presence of oxygen, and ionizes to a considerable degree, its combined capacity for both inhibiting the oxidation of air-sensitive sun ray filter compositions and preserving the emulsion base was quite unexpected.

Among the other compounds that have proved to be useful for the purpose in view, are dihydroxy maleic acid, d-ascorbic acid, l-arabo-ascorbic acid, glucono-ascorbic acid, hydroxy-tetronic acid, the monoacetone derivative of l-ascorbic acid, and their alkali metal and alkaline earth metal salts. The sun ray preparation preferably contains an acidic substance in such quantity that at least part of such salts are converted to the free acid condition.

These compounds have an inhibiting and thereby stabilizing action not only on hydroquinone, but on other sun ray filtering materials, including menthyl salicylate, umbelliferone acetic acid, sodium (or other suitable metal salt), 2,6-dichloro-pyridine-4-carboxylic acid and its esters and salts, for example, the ethyl and cetyl esters, and in general other unstable sun ray filtering or "sun-tan" preparations.

The inhibitors or anti-oxidation agents above described are ene-diols or enol forms of 2-keto-3-hydroxy acids of the general formula above presented. The preferred compounds are those in which R' is —COOH or a chain containing an OH radical at least on the 4-carbon. Thus R' may be

wherein R''' is

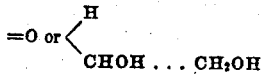

i. e. a polyhydroxy chain.

The inhibitor need be present in only small amount, say about 1 to 5% of the weight of the hydroquinone or other sun ray filter, which in turn may be present to the extent of about 5% of the whole cosmetic preparation. Somewhat smaller amounts than 1% will be effective in certain instances and in general the amounts will be varied in dependence upon the sensitivity of the sun ray filtering substance and upon the conditions of storage, the probable shelf life of the preparations, etc. An excess of the inhibiting agent will ordinarily not be detrimental, and if desired, as much as 50% of laevo-ascorbic acid, based upon the weight of the ray filtering substance, may be employed. We have found that a cream containing 5% of hydroquinone and 0.05% of laevo-ascorbic acid, and containing a white cream base, remained white and the emulsion remained homogeneous after many months of storage under typical conditions.

The base of the cream or lotion containing the sun ray filtering agent and oxidation inhibitor may be of various types, provided only that it contains no substances which will react with either the filter or the inhibitor in a manner to destroy their intended functions. The base may be unguent in character or not, as desired; and where fatty substances are present, they are preferably of a type that is stable toward air.

The following examples present various formulae in accordance with the invention, but it will be understood that the latter is not restricted thereto:

Example 1

| | Grams |
|---|---|
| I. Stearic acid | 20 |
| Cetyl alcohol | 2 |
| Hydroquinone | 5 |
| Laevo-ascorbic acid | 0.25 |
| II. Borax | 1 |
| Sodium carbonate | 2 |
| Glycerine | 6 |
| Water, enough to make | 110 |

Mixture I is molten, then emulsified with a heated solution of II. By stirring until cold, a fine vanishing cream is obtained.

Example 2

| | Grams |
|---|---|
| Tragacanth, powdered | 2 |
| Stearic acid | 12 |
| Glycerin | 6 |
| Hydroquinone | 5 |
| Laevo-ascorbic acid | 0.15 |
| Monohydrated sodium carbonate | 1 |
| Borax | 1 |
| Distilled water, enough to make | 100 |

The water, borax, sodium carbonate, and glycerin are heated until warm. The stearic acid is then added and the whole stirred occasionally. When it has dissolved, the tragacanth is added under vigorous stirring. The mixture is allowed to cool and is stirred until smooth. The cream may be passed through a colloid mill to reduce it to an extremely fine condition.

Example 3

| | Grams |
|---|---|
| Stearic acid | 6 |
| Cocoa butter | 1 |
| Sodium carbonate crystals | 2 |
| Borax | 2 |
| Talc | 16 |
| Glycerine | 6 |
| Alcohol | 4 |
| Hydroquinone | 10 |
| Laevo-ascorbic acid | 0.3 |
| Distilled water, enough to make | 110 |

Melt the stearic acid and cocoa butter, then add, with constant stirring, a solution of the sodium carbonate, borax, and glycerine in hot water, until a soap-like mass has formed. Then incorporate the talc. When cool, mix in the alcoholic solution of hydroquinone, and ascorbic acid; then add any suitable amount of perfume. The sodium carbonate crystals may be replaced by one-half the quantity of the monohydrated salt.

Example 4

| | Grams |
|---|---|
| Stearic acid | 16 |
| Castor oil | 2 |
| Borax | 1–2 |
| Ammonia water | 10 |
| Glycerin | 16 |
| Witch hazel oil | 20 |
| Hydroquinone | 8 |
| Laevo-ascorbic acid | 0.4 |
| Water, enough to make | 100 |

The stearic acid is melted and there are added thereto with constant stirring the castor oil and ammonia. To this mixture there is then added a hot solution of the borax and glycerin. There are finally mixed in the witch hazel oil, hydroquinone, and laevo-ascorbic acid.

Example 5

| | Grams |
|---|---|
| Glycerol stearate | 15.5 |
| Glycerol | 4.5 |
| Spermaceti | 5.0 |
| Citric acid | .2 |
| Mineral oil | 2.0 |
| "Tegosept M" (p-hydroxy-benzoic acid methyl ester) | .12 |
| Water | 67.38 |
| Dextro-ascorbic acid | .2 |
| Hydroquinone | 5.0 |
| Bergamot | .1 |

The spermaceti is first melted and is mixed with the glycerol stearate, glycerol, and mineral oil, with stirring. When this mixture is cool there are added thereto the other ingredients listed above and the mass is mixed until a smooth cream is obtained.

In the above examples the laevo or dextro-ascorbic acid can be replaced by dihydroxymaleic acid, l-arabo ascorbic acid, glucono ascorbic acid, hydroxy tetronic acid, and their salts, somewhat larger amounts of these antioxidants being, if desired, employed than the amounts indicated above for laevo-ascorbic acid.

Although our preparations, in their preferred form, are compounded as creams, of the vanishing or non-vanishing varieties, it will be obvious that for example, the hydroquinone and laevo-ascorbic acid may be incorporated in lotion bases and also in powders or wax-sticks which are applied by rubbing upon the skin, by employing suitable vehicles, as will be readily understood by those skilled in the art.

In our present application we claim the above described anti-oxidants broadly, the ascorbic acid compounds being claimed as a class, and dextro-ascorbic and glucono-ascorbic acid and dihydroxymaleic acid being claimed specifically; while laevo-ascorbic acid is claimed specifically in our copending application Serial No. 405,795, filed August 7, 1941.

We claim:

1. A sun ray filtering preparation for preventing sunburn of the human skin when exposed to sun rays while permitting beneficial and tanning rays to pass through to the skin, comprising an emulsified vehicle adapted to be spread upon the skin and containing an air-sensitive filtering agent of the group consisting of hydroquinone, menthyl salicylate, umbelliferone acetic acid salts, 2,6-dichloro-pyridine-4-carboxylic acid and its esters and salts, and an oxidation inhibitor in the form of a reducing compound of the group consisting of laevo and dextro ascorbic acids, arabo-ascorbic acid, glucono-ascorbic acid, the mono acetone derivative of l-ascorbic acid, dihydroxy maleic acid and hydroxytetronic acid, and their alkali and alkaline earth metal salts, said preparation being stable and retaining substantially its normal color over long periods of time.

2. A sun ray filtering preparation as defined in claim 1, wherein the vehicle is an emulsified aqueous cream base and is devoid of fatty substances which are oxidized in the air.

3. A sun ray filtering preparation for preventing sunburn of the human skin when exposed to sun rays while permitting beneficial and tanning rays to pass through to the skin, comprising a vehicle adapted to be spread upon the skin and containing an air-sensitive filtering agent of the group consisting of hydroquinone, menthyl salicylate, umbelliferone acetic acid salts, 2,6-dichloro-pyridine-4-carboxylic acid and its esters and salts and an oxidation inhibitor in the form of a compound which provides free ascorbic acid in said preparation, said inhibitor being present in catalytic amounts, and said preparation being stable and retaining substantially its normal color over long periods of time.

4. A preparation as defined in claim 1, wherein the filtering agent is hydroquinone.

5. A sun ray filtering preparation for preventing sunburn of the human skin when exposed to sun rays while permitting beneficial and tanning rays to pass through to the skin, comprising a vehicle adapted to be spread upon the skin and containing hydroquinone and, as an oxidation inhibitor, a compound which provides a free ascorbic acid in said preparation, said inhibitor being present in catalytic amounts, and said preparation being stable and retaining substantially its normal color over long periods of time.

6. A sun ray filtering preparation for preventing sunburn of the human skin when exposed to sun rays while permitting beneficial and tanning rays to pass through to the skin, comprising an emulsified vehicle adapted to be spread upon the skin and containing hydroquinone and, as an oxidation inhibitor, glucono ascorbic acid, said preparation being stable and retaining substantially its normal color over long periods of time.

7. A sun ray filtering preparation for preventing sunburn of the human skin when exposed to sun rays while permitting beneficial and tanning rays to pass through to the skin, comprising an emulsified cream base adapted to be spread upon the skin and containing hydroquinone and, as an oxidation inhibitor, a compound which provides a free ascorbic acid in said preparation, said inhibitor being present in catalytic amounts, and said preparation being stable and retaining substantially its normal color over long periods of time.

8. A sun ray filtering preparation for preventing sunburn of the human skin when exposed to sun rays while permitting beneficial and tanning rays to pass through to the skin, comprising an emulsified cream base adapted to be spread upon the skin and containing hydroquinone and having incorporated therein a quantity of dextro ascorbic acid, said preparation being stable and retaining substantially its normal color over long periods of time.

9. A sun-tan cream for preventing sunburn of the human skin when exposed to sun rays while permitting beneficial and tanning rays to pass through to the skin, comprising an emulsified creamy base adapted to be spread upon the skin and containing hydroquinone, and having incorporated therein, in an amount of the order of about 5% of the hydroquinone, a compound which provides a free ascorbic acid in said preparation.

10. A sun ray filtering preparation for preventing sunburn of the human skin when exposed to sun rays while permitting beneficial and tanning rays to pass through to the skin, comprising a vehicle adapted to be spread upon the skin and containing hydroquinone and dihydroxy maleic acid in quantity sufficient to inhibit substantial decomposition of the hydroquinone, said preparation being stable and retaining substantially its normal color over long periods of time.

ERWIN SCHWENK.
EDWARD E. HENDERSON.